Figure 1:
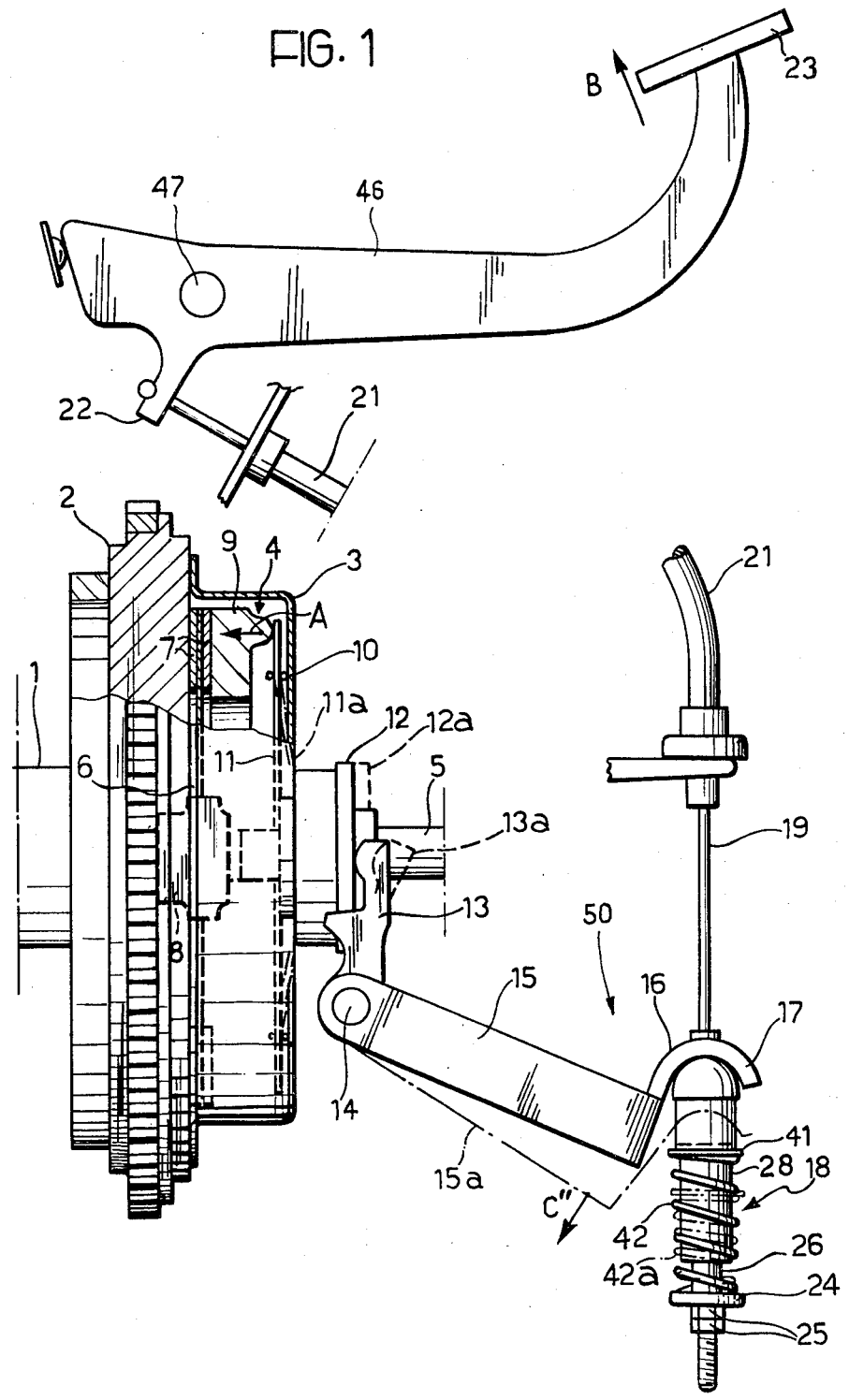

United States Patent [19]

Jacoponi

[11] 4,239,098
[45] Dec. 16, 1980

[54] HYDRAULICALLY DAMPED AUTOMATIC PLAY COMPENSATION DEVICE FOR MOTOR VEHICLE CLUTCHES

[75] Inventor: Stefano Jacoponi, Turin, Italy

[73] Assignee: Fiat Auto S.p.A., Turin, Italy

[21] Appl. No.: 26,704

[22] Filed: Apr. 3, 1979

[30] Foreign Application Priority Data

Apr. 12, 1978 [IT]    Italy .................................. 67809 A/78

[51] Int. Cl.³ ............................................. F16D 13/75
[52] U.S. Cl. ................................................. 192/111 A
[58] Field of Search ............ 192/111 A, 111 R, 70.25; 188/196 A, 79.5 R, 71.8

[56]    References Cited

U.S. PATENT DOCUMENTS

| | | | |
|---|---|---|---|
| 3,171,526 | 3/1965 | Waclawek | 192/111 A |
| 3,489,257 | 1/1970 | Nakano | 192/111 A |
| 3,765,522 | 10/1973 | Dahlkvist et al. | 192/111 A |
| 3,850,268 | 11/1974 | Guettier | 188/71.8 |
| 3,946,845 | 3/1976 | Kamio | 192/111 A |

Primary Examiner—George H. Krizmanich
Attorney, Agent, or Firm—Sughrue, Rothwell, Mion, Zinn & Macpeak

[57] ABSTRACT

A hydraulically damped automatic play compensation device for a motor vehicle clutch comprises a lever attached at one end to a clutch operating fork, and acting at the other end on a hydraulic damping cylinder which is axially slidable on a shaft, connected by a cable to a pedal lever and having a piston member with flow restriction means. Compensation for the play due to wear of the clutch is effected, between working strokes, by a displacement of the cylinder relative to the shaft which causes restricted flow transfer of an hydraulic fluid between two chambers in the cylinder and transmits the force of a subsequent working stroke directly to the lever maintaining the play compensating displacement of the cylinder.

5 Claims, 2 Drawing Figures

HYDRAULICALLY DAMPED AUTOMATIC PLAY COMPENSATION DEVICE FOR MOTOR VEHICLE CLUTCHES

The present invention relates to a hydraulically damped automatic play compensation device for motor vehicle clutches.

The invention is concerned with a hydraulically damped automatic play compensation device for use with motor vehicle clutches particularly, but not exclusively, of the dry single-plate type.

It is well known in motor vehicle clutches, for example, of the dry single-plate type, that the wear of the clutch friction linings resulting from engagement and disengagement of the clutch results in a progressively increasing degree of play between the clutch ring, the drive plate and the engine flywheel.

Where no provision is made to compensate for this play the rest position of the clutch pedal, after each working stroke, will gradually rise from its original position, often by as much as 3 centimeters, as the wear increases. This is a serious disadvantage, causing inconvenience for the driver and changing the rest position of the clutch pedal relative to the other foot pedals.

The object of the present invention is to provide a hydraulically damped device which automatically compensates for such play caused by wear of the clutch friction linings and, thereby, prevents the aforesaid raising of the rest position of the clutch pedal.

An additional object of the invention is to provide such a device which may be fitted quickly to an existing clutch of a vehicle already in use, without altering the normal operation of the clutch mechanism, and which is of simple and lightweight construction.

According to the present invention there is provided a hydraulically damped automatic play compensation device for a motor vehicle clutch, comprising a lever attached at one end to a clutch disengaging member for rotation about an axis, and acting at the other end on a hydraulic damping cylinder slidable upon a coaxial shaft which is connected, by a force transmitting element, to a clutch control lever to which, during a working stroke, a clutch-disengaging force is applied, the said cylinder being filled with hydraulic fluid and being subdivided internally into two chambers by a piston member attached to said shaft, and flow restriction means interconnecting said chambers, whereby, between working strokes, the cylinder is displaced relative to the shaft by an amount which compensates for wear in the clutch, the fluid pressure in the two chambers being equilibrated by flow through the restriction means, and the damping effect of the cylinder being such that, upon a subsequent working stroke, the force transmitting element transmits the clutch-disengaging force directly to the lever through the cylinder substantially without relative movement between the cylinder and shaft.

Figure 2:
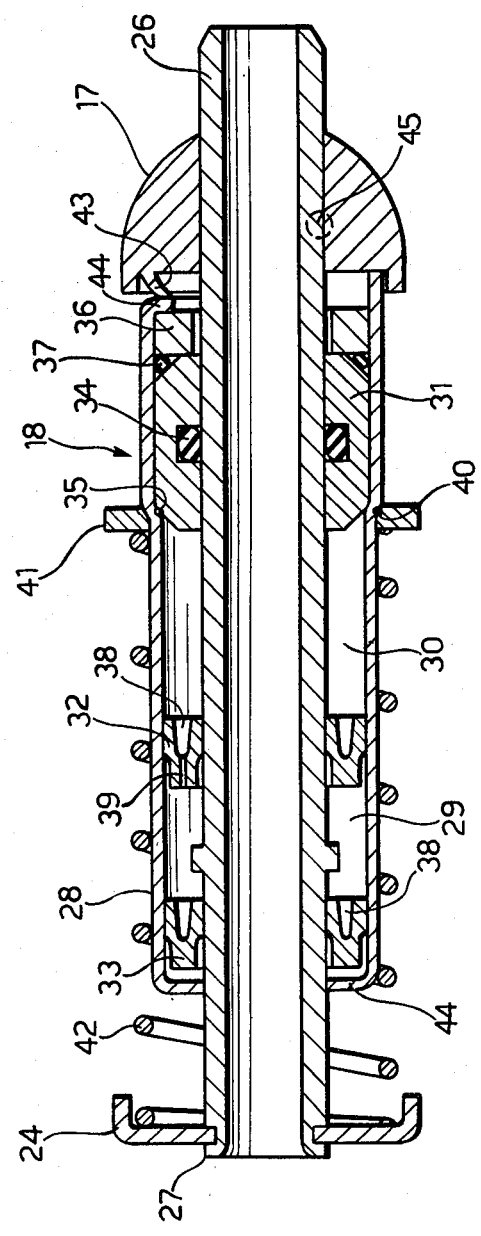

One embodiment of the invention will now be more particularly described, by way of example, with reference to the accompanying purely diagrammatic drawings, in which:

FIG. 1 is a fragmentary, partly cut-away side view of a motor vehicle clutch incorporating a hydraulically damped automatic play compensation device according to the invention, and FIG. 2 is a longitudinal section, on an enlarged scale, of a part of the play compensation device of FIG. 1.

Referring now to the drawings, an engine shaft 1 is connected, in known manner, to a flywheel 2 which is attached to a clutch case 3. The clutch case 3 houses a known clutch mechanism, generally indicated 4, which controls the disconnection of the engine shaft 1 from an input shaft 5 of a gearbox (not shown).

The clutch mechanism 4 includes, in known manner, a drive plate 6 faced on both sides by respective friction linings 7 and coupled to a hub 8 which is located in a central hole in the plate 6. The hub 8 has a splined coupling with the gearbox input shaft 5. The drive plate 6 is pressed between the flywheel 2 and a clutch ring 9 by an annular disc spring 11 which abuts, at its inner periphery, one end of a movable clutch release sleeve 12 carried on the gearbox input shaft 5. The spring 11 acts at its outer periphery against the clutch ring 9, the spring 11 being pivoted about fulcrum members 10 located radially between the sleeve 12 and the clutch ring 9 to urge the clutch mechanism 4 into an engaged position (shown in FIG. 1) in which it couples the engine shaft 1 to the gearbox input shaft 5.

Disengagement of the clutch is effected, conventionally, by depression of a clutch pedal 23.

A fork 13, which abuts the other end of the sleeve 12, causes a translational movement of the sleeve 12 towards the hub 8 when the clutch pedal 23 is depressed by the driver's foot in a working stroke. This movement of the clutch release sleeve 12 on the gerabox input shaft 5 causes the spring 11 to disengage the clutch ring 9 from the drive plate 6, disconnecting the engine shaft 1 from the gearbox input shaft 5, and therefore disengaging the clutch.

More specifically, in the illustrated embodiment the clutch pedal 23 is attached to one end of a lever 46, comprising the clutch control lever, and receives the clutch disengaging force which causes the pedal lever 46 to rotate downwardly (as seen in FIG. 1) in a working stroke about a pivot 47 pulling a force transmitting element, comprising a Bowden cable 19. The cable 19 is, in the usual manner, enclosed for most of its length in a flexible sheath 21 fixed at each end to the vehicle body. One end of the cable 19 is anchored to a lug 22 on the pedal lever 46, and the other end is attached to a hydraulically damped automatic play compensating device, generally indicated 50, which interconnects the cable 19 and the fork 13, so that depressing the pedal lever 46 causes the aforesaid movement of the clutch release sleeve 12.

The play compensating device 50 comprises a lever 15 which, together with the fork 13, is keyed at one end to a pivot pin 14. The fork 13 and the lever 15 are fixed relative to each other for rotation about the axis of the pin 14. An arcuate bracket 16 is attached to the other end of the lever 15 and, in use, abuts a part-spherical cap 17 at one end of a hydraulic damping device, generally indicated 18. The cable 19 extends coaxially through the device 18 and the cap 17, being attached to a retainer 24 at the other end of the device 18. After initial adjustment of the desired rest position of the control lever 46 the retainer 24 is fixed to the cable 19 by clamping means 25 comprising a nut and locking nut.

As shown in FIG. 2, the device 18 includes the cap 17, which is fixed externally to one end thereof, an axial, hollow shaft 26 for the cable 19 and the retainer 24 which is attached by swaging to the lower end 27 of the shaft 26. The shaft 26 is coaxial with, and slidable in, a cylinder 28 which surrounds the shaft 26 to define first and second axially-spaced, annular chambers 30, 29, respectively, filled by a hydraulic fluid such as oil. The chambers 29, 30 are separated by a piston member 32 which is fixed to the shaft 26 and are closed by plug members 31, 33, fixed within the opposite ends of the cylinder 28, through which the shaft 26 is sealingly slidable.

The cylinder 28 is axially spaced from the retainer 24 by a spring 42 which coaxially surrounds the exterior of the cylinder 28.

The plug member 31 abuts, at its inner end, an internal annular shoulder 35 formed in the wall of the cylinder 28 and is provided with a sealing ring 34 which surrounds the shaft 26. The outer end of the plug member 31 abuts an annular closure element 36 which is provided with a sealing ring 37 and closes the adjacent end of the cylinder, being retained by a swaged lip 44 at said end of the cylinder 28. The piston member 32 and plug member 33 are each provided with annular recesses 38 in known manner. Flow-restricting passages 39 through the piston member 32 interconnect the chambers 29, 30.

One end of the spring 42 abuts the retainer 24, and its other end abuts a washer 41 which is force-fitted onto an external step 40 corresponding to the internal shoulder 35 of the cylinder 28. The cap 17 is provided with axial tongues 43 (one of which is shown) which abut the swaged lip 44 of the cylinder 28 and ensure the correct positioning of the cap 17 on the shaft 26 during assembly. The cap 17 is retained on the shaft 26 by a key 45 (shown in broken outline in FIG. 2) which is removed when the cap is engaged with the bracket 16, to form a ball-and-socket joint kept in engagement by the spring 42.

The device operates as follows: when the pedal lever 46 is depressed in a working stroke, the cable 19 is tensioned pulling the device 18 upwards (as seen in FIG. 1) and causing an anti-clockwise rotation of the lever 15 and the fork 13 about the pivot pin 14 to effect a translational movement of the clutch release sleeve 12 and disengage the clutch, as described above.

When the driver's foot is lifted from the clutch pedal 23, the cable 19 relaxes allowing the pedal lever 46 to return to its rest position. The spring 11 pushes the clutch release sleeve 12 back, in a return stroke, causing rotation of the fork 13 and the device 50 in a direction opposite to that described above.

During use over a period the clutch friction linings 7 will become worn causing a progressive displacement of the clutch ring 9 towards the drive plate 6. This displacement, indicated by arrow A in FIG. 1, results in an excessive bowing 11a of the spring 11, which, in turn, axially displaces the clutch release sleeve 12 and the fork 13 into new positions 12a, 13a respectively, resulting from the wear in the clutch. These displacements cause, between working strokes, the clockwise rotation of the lever 15 in the direction of arrow C to a new position 15a together with a corresponding displacement of the cap 17, and would, in the absence of the compensating device 50, result in a lifting of the rest position of the pedal lever 46 in the direction of arrow B (FIG. 1). Upon the return stroke, however, the arcuate bracket 16 of the lever 15 presses on the cap 17 causing an axial displacement of the cylinder 18 along the shaft 26 by an amount corresponding to the displacement of the clutch release sleeve 12 due to the wear of the friction linings 7, the compression of the spring 42 maintaining the engagement of the bracket 16 with the cap 17.

As the cylinder 18 is displaced along the shaft 26, its movement relative to the piston member 32 causes an increase in the fluid pressure in the first chamber 30, which results, between working strokes, in a restricted flow transfer of the fluid from the first chamber 30 to the second chamber 29 through the passages 39 in the piston member 32. The flow continues until the pressures in the chambers are in equilibrium, with the lever 15 now in its new position 15a, thereby maintaining a constant rest position of the retainer 24 and, therefore, the pedal lever 46.

When the pedal lever 46 is operated in a subsequent working stroke, the flow restricting passages 39 resist a rapid return flow of the fluid to the first chamber 30 and, therefore the clutch disengaging force is transmitted directly to the lever 15 substantially without relative movement between the cylinder 18 and the shaft 26. In this way, the device 18 acts as a damper and the flow restricting passages 39 allow a slow equilibration of the fluid pressure in the chambers 29, 30 to a new play compensating level after each working stroke.

An automatic play compensation device constructed in the manner described above has a simplicity of construction and operation due to a reduced number of component parts. The device ensures that the rest position of the clutch pedal remains constant without affecting the efficient operation of the clutch and, thereby, avoids the necessity of adjusting the clutch during the lifetime of the friction linings.

What is claimed is:

1. Hydraulically damped automatic play compensating device for a motor vehicle clutch including:

a clutch control lever which effects a working stroke upon the application of a clutch-disengaging force thereto;

means for transmitting said force, and a fork operable by said control lever, through said means, wherein said play compensating device comprises, in combination:

a lever attached at one end to said fork;

means supporting said lever for pivotal movement about a pivot axis at said one end;

a hydraulic damping cylinder acted upon by the other end of said lever and filled with hydraulic fluids;

a shaft coaxial with said cylinder and slidable relative thereto, said shaft being connected by said force transmitting means to said control lever;

a piston member attached to said shaft and subdividing said cylinder into two chambers, and flow restriction means interconnecting said two chambers, whereby, between working strokes, said cylinder is displaced relative to said shaft by an amount which compensates for wear in said clutch, the fluid pressure in said two chambers being equilibrated by flow through said restriction means, and the damping effect of said cylinder being such that, upon a subsequent working stroke, said force transmitting means transmits said force directly to said lever through said cylinder substantially without relative movement between said cylinder and said shaft.

2. Device as defined in claim 1, wherein said force transmitting means passes through said shaft and is secured to its end remote from said control lever.

3. Device as defined in claim 1, wherein said lever acts on said cylinder through means which upon rotation of said lever effect said displacement of said cylinder on said shaft.

4. Device as defined in claim 3, wherein said means for displacing said cylinder comprise a cap having a rounded surface which engages an arcuate bracket carried at said other end of said lever.

5. Device as defined in claim 4, wherein resilient means act between said cylinder and said shaft to maintain said cap in engagement with said bracket.

* * * * *